United States Patent Office 2,773,905
Patented Dec. 11, 1956

2,773,905

SEPARATING PRIMARY MERCAPTANS FROM MIXTURES OF MERCAPTANS

Russell H. Brown, Hammond, Ind., assignor to Standard Oil Company, Chicago, Ill., a corporation of Indiana No Drawing. Application February 7, 1955,
Serial No. 486,701

7 Claims. (Cl. 260—609)

This invention relates to the separation of primary mercaptans from admixture with secondary and/or tertiary mercaptans. Particularly it relates to the separation of n-alkyl mercaptans from branched chain primary mercaptans and/or secondary mercaptans and/or tertiary mercaptans.

It has been discovered that primary mercaptans and particularly those primary mercaptans having a straight chain hydrocarbon group are readily separated from admixture with secondary mercaptans and/or tertiary by contacting the mixture with aqueous triethanolamine containing dissolved lead. Essentially pure primary mercaptan is obtained in the form of lead mercaptide when enough triethanolamine is present to suppress the ability of the dissolved lead to combine with the secondary and tertiary mercaptans. Hereinafter the triethanolamine inactivated lead, i. e., inactivated with respect to secondary and tertiary mercaptans is spoken of as a TEA-lead complex.

The aqueous solution of triethanolamine and lead may consist of water, triethanolamine and a soluble lead salt. It is preferred that the solution be derived by dissolving litharge, PbO, in the aqueous TEA solvent. Or the aqueous solution may consist of water, alkali metal hydroxide, triethanolamine and soluble lead. The soluble lead may be obtained by dissolving into the aqueous caustic-TEA solution litharge or lead sulfate. The well-known Doctor solution utilized in the petroleum refining industry for converting mercaptans in petroleum distillates to disulfides by adding free sulfur is a particularly suitable aqueous solvent for use in the invention. The aqueous caustic TEA solvent may contain sodium hydroxide or potassium hydroxide in any amount up to the saturation point at the particular temperature of operation. Usually the solvent will contain between about 10 and 30 weight percent of sodium hydroxide.

It is believed that the triethanolamine inactivates the soluble lead for its normal reaction with all mercaptans by forming a complex with the lead. The spatial configuration of the complex hinders the approach of the secondary and tertiary mercaptans and also to some extent branched chain primary mercaptans to the dissolved lead. On the other hand, the primary mercaptans, particularly the straight chain mercaptans, are not appreciably hindered and can pass through the complex and react with the lead to form the lead mercaptide. The presence of uncomplexed lead permits the normal reaction with secondary and tertiary mercaptans. Therefore, for the maximum effectiveness in separation of primary mercaptans from the secondary and tertiary mercaptans—as measured by purity—sufficient triethanolamine should be present in the aqueous solution to complex all the soluble lead. When using the so-called Doctor solution as the aqueous solvent, the presence of about 2 volume percent of triethanolamine in the solution is sufficient to complex all the soluble lead when the solution contains on the order of 1.5 grams of soluble lead, calculated as PbO, per 100 ml. of solution. This amount corresponds to about 2 moles of triethanolamine per mole of dissolved lead. The presence of additional triethanolamine is desirable and as much as 5 moles of TEA or more may be present per mole of dissolved lead.

The amount of aqueous solution used is sufficient to form a distinct separate aqueous phase when contacting a liquid mixture of mercaptans. In general, the amount of soluble lead needed to react with the primary mercaptans in the charge to the process will determine the amount of aqueous solution utilized in the process.

The term "primary mercaptan" as used herein applies to an aliphatic mercaptan wherein the carbon atom to which the SH group is joined is, in turn, joined to only one carbon atom. For example, n-propyl mercaptan, n-butyl mercaptan, n-dodecyl mercaptan, n-hexadecyl mercaptan, isobutyl mercaptan (2-methylpropanethiol) and allyl mercaptan. The term "secondary mercaptans" as used herein includes those mercaptans wherein the carbon atom to which the SH group is joined to 2 other carbon atoms. For example, isopropyl mercaptan, sec-butyl mercaptan, 1-methylheptanethiol, cyclohexyl mercaptan and thiophenol. The term "tertiary mercaptain" as used herein includes those mercaptans wherein the carbon atom joined to the SH group is, in turn, joined to 3 other carbon atoms, for example, tert-butyl mercaptan and tert-octyl mercaptan.

The temperature at which the process is carried out may be substantially any temperature below the boiling point of the aqueous solution and also below the decomposition temperature of the lead mercaptide which is desired to be formed. In general, the temperature of operation will be between about 50° F. and 200° F. and more usually at ordinary atmospheric temperatures on the order of 70 to 100° F.

The separation obtainable with the process of the invention are illustrated by the following working examples.

EXAMPLE 1

In this example, each test was carried out by dissolving C. P. grade mercaptan in cetane to produce a solution containing 20 mg. of mercaptan sulfur per 100 ml. of solution. Two aqueous solutions were used, (1) a Doctor solution consisting of 20% aqueous caustic containing 2 grams of dissolved lead, calculated as PbO, per 100 ml. of solution and (2) an aqueous solution corresponding to the Doctor solution but also containing 2 volume percent of triethanolamine. Each test was carried out by contacting 100 ml. of the cetane-mercaptan solution with 4 volume percent of aqueous solution, and noting the formation of mercaptide by the appearance of either a yellow precipitate or a yellow color in the cetane solution. In those cases where the mercaptide was insoluble in the cetane, a yellow precipitate was formed; when the mercaptide was soluble in the cetane, a yellow color was imparted to the cetane solution. The results of these tests are set out in Table I following.

*Table I*

| Mercaptan | Type | Aqueous solution | |
|---|---|---|---|
| | | No TEA | 2 vol. percent TEA |
| n-Heptyl | Primary | Yellow precipitate. | Yellow precipitate. |
| n-Dodecyl | do | do | Do. |
| Cyclohexyl | Secondary | Yellow solution | Colorless solution, no precipitate. |
| 2-n-Pentyl | do | do | Do. |
| t-Butyl | Tertiary | Yellow precipitate | Do. |
| t-Octyl | do | Yellow solution | Do. |
| Thiophenol | Aromatic (secondary) | do | Do. |

The results of the experiments set out in Table I show quite clearly that the presence of triethanolamine in Doctor solution inactivates the soluble lead toward secondary and tertiary mercaptans. In these experiments, the TEA corresponded to approximately 1.7 moles per mole of soluble lead.

EXAMPLE 2

In this example, the aqueous solution consisted of water and triethanolamine containing dissolved therein about 2 grams of soluble lead calculated as PbO per 100 ml. of solution. The mercaptans utilized in Example 1 were utilized in the tests in this example. The results obtained using aqueous solution consisting of water, TEA and soluble lead were identical with those obtained in Example 1 as set out in Table I.

EXAMPLE 3

In this example, a petroleum kerosene containing 21 mg. of mercaptan sulfur per 100 ml. of kerosene was treated with various Doctor solutions. In each test the kerosene was treated with 4 volume percent of aqueous solution containing 2 grams of soluble lead calculated as PbO per 100 ml. of solution. Four volume percent of aqueous solution based on kerosene was used in each test and the contacting temperature was 78° F. In each test the free sulfur was added to the kerosene to convert the oil-soluble lead mercaptides to disulfides and the kerosene was water-washed to remove lead sulfide and aqueous solution. The mercaptan number of the mercaptide-free kerosene was determined in each test. This permitted observation of the effect of TEA presence on the amount of mercaptan converted. The results of these tests are set out in Table II below.

*Table II*

| Aqueous solution percent TEA | Mercpatan number treated oil | PbO remaining in aqueous solution, g/100 ml. |
|---|---|---|
| None | 4.5 | 0.19 |
| 2 | 13.5 | 1.10 |
| 5 | 17.3 | 1.36 |

These tests show that adding triethanolamine to the Doctor solution reduced the amount of mercaptide formation very markedly. These tests show that very little primary mercaptans are present in petroleum distillates which boil in the heavier-than-gasoline range. This is commonly known to the art.

EXAMPLE 4

In this example, a test was carried out with isobutyl mercaptan (2-methylpropanethiol) in order to determine the effect of the presence of a methyl branching on the reactivity of a primary mercaptan with the lead present in an aqueous triethanolamine solution. The isobutyl mercaptan reacted much more slowly than did the mercaptans which had a straight chain hydrocarbon group, i. e., n-aliphatic mercaptans. This branched chain primary mercaptan dissolved in a manner somewhat intermediate between the straight chain primary mercaptans and secondary mercaptans.

The presence of free oxygen is particularly undesirable when using caustic-containing triethanolamine solution. Apparently the secondary and tertiary mercaptans are converted to some extent, depending on time, temperature and caustic concentration, to the corresponding disulfides by the free oxygen. This is particularly true when PbS is present in the aqueous solution. Triethanolamine itself appears to have some catalytic effect and for this reason the presence of free oxygen is undesirable even when utilizing aqueous TEA solution which contains no caustic.

The process described herein may be utilized in many different ways for the separation of primary mercaptans, particularly straight chain primary mercaptans, from secondary and tertiary mercaptans. Thus a mixture of primary, secondary and tertiary mercaptans of relatively low boiling points may be contacted in the vapor state with liquid aqueous triethanolamine solution containing soluble lead. This contacting is preferably carried out in a packed tower. The primary mercaptans react with the lead to form lead mercaptides which pass down the tower with the aqueous solution and are recovered therefrom by filtration. The secondary and tertiary mercaptans pass out of the tower and are recovered by condensation. By the use of sufficient triethanolamine to complex all the soluble lead, preferably about 5 moles per mole of soluble lead, essentially no secondary and tertiary mercaptans are removed. Still another embodiment: The solution of sodium mercaptides present in aqueous caustic solution which has been used to contact a mercaptan-containing petroleum distillate, for example naphtha, may have triethanolamine and litharge added thereto. The primary mercaptans react to form lead mercaptides. These lead mercaptides may then be converted to disulfides by adding free sulfur to the aqueous caustic extract. The disulfides may then be extracted from the aqueous caustic by contacting with a low boiling hydrocarbon such as pentane or hexane. The primary mercaptans may then be recovered by distillating away the low boiling hydrocarbons from the disulfides and reducing the recovered disulfides to the mercaptans.

Still another embodiment: A mercaptan-containing oil may be contacted with Doctor solution containing from about 2–5 volume percent of triethanolamine in the presence of free sulfur. Under these conditions, the primary mercaptans in the oil will be converted to the corresponding disulfides without appreciable conversion of the secondary and tertiary mercaptans. (It is considered that some precautions have been taken to exclude atmospheric air from the sour oil and the Doctor solution in order to avoid air oxidation of the secondary and tertiary mercaptans.) These disulfides generally are much higher boiling than the oil itself and may be recovered from the oil by distilling, preferably vacuum distillation. The primary mercaptans may then be obtained by reduction of the disulfides.

It is to be understood that the above specific embodiments are not limiting and that the invention may be utilized in many other ways for the separation of primary mercaptans, particularly straight chain primary mercaptans from secondary and tertiary mercaptans.

Thus having described the invention, what is claimed is:

1. A mercaptan separation process which comprises contacting a mixture containing a primary mercaptan and at least one mercaptan from the class consisting of secondary and tertiary with an aqueous solution consisting essentially of water, triethanolamine and soluble lead, in the substantial absence of free-oxygen, and separating lead primary mercaptide from unreacted mercaptans of the class consisting of secondary and tertiary.

2. The process of claim 1 wherein at least about 2 moles of TEA are present per mole of soluble lead.

3. The process of claim 1 wherein an alkali metal hydroxide is present in said solution.

4. The process of claim 3 wherein said soluble lead is present in an amount of about 2 g./100 ml., calculated as PbO, and said solution contains at least 2 volume percent of TEA.

5. A mercaptan separation process which comprises preparing, in the substantial absence of free-oxygen, an aqueous alkali-metal hydroxide mixed mercaptide solution containing mercaptides formed by the reaction of alkali-metal hydroxide and a primary mercaptan and at least one mercaptan from the class consisting of secondary and tertiary mercaptans, adding triethanolamine and plumbite to said solution to obtain a solution containing TEA, said TEA addition being sufficient to inactivate the plumbite with respect to mercaptans other than primary mercaptans, adding free-sulfur to the TEA containing solution to convert primary mercaptides to disulfides and thereby obtain a mixture of an aqueous TEA solution of alkali-metal mercaptides of the class consisting of secondary and tertiary and disulfides, and physically removing said disulfides from said mixture.

6. The process of claim 5 wherein said aqueous caustic mixed mercaptide solution is prepared by contacting a sour naphtha with aqueous caustic solution.

7. The process of claim 5 wherein about 5 moles of TEA are present per mole of soluble lead added.

No references cited.